United States Patent [19]
Ohmori

[11] Patent Number: 5,530,748
[45] Date of Patent: Jun. 25, 1996

[54] POWER SUPPLYING SYSTEM FOR TERMINAL

[75] Inventor: Hisakazu Ohmori, Kawasaki, Japan

[73] Assignee: Fujitsu Limited, Kanagawa, Japan

[21] Appl. No.: 274,626

[22] Filed: Jul. 13, 1994

[30] Foreign Application Priority Data

Jan. 14, 1994 [JP] Japan .................................... 6-002426

[51] Int. Cl.⁶ ................................................. H04M 19/06
[52] U.S. Cl. ......................... 379/413; 379/399; 379/412; 323/324; 323/246
[58] Field of Search .................................: 379/413, 399, 379/412; 330/277, 151, 300, 311; 323/324, 246, 325; 361/93

[56] References Cited

U.S. PATENT DOCUMENTS

| | | | |
|---|---|---|---|
| 4,147,970 | 4/1979 | Okuda et al. | 320/21 |
| 4,380,687 | 4/1983 | Stewart | 379/413 |
| 4,425,512 | 1/1984 | Tomooka et al. | 379/413 |
| 4,710,699 | 12/1987 | Miyamoto | 323/324 |

Primary Examiner—Jeffery Hofsass
Assistant Examiner—Jacques M. Saint-Surin

[57] ABSTRACT

A power supplying system is adapted to a subscriber terminating equipment that supplies power to a subscriber terminal equipment based on a supply of power from an external power supply part. The power supplying system includes an excess current limiting circuit stopping a supply of power within the subscriber terminating equipment when an excess current is generated in the supply of power from the external power supplying part, and an excess current detection circuit detecting an excess current state.

12 Claims, 7 Drawing Sheets

POWER SUPPLYING SYSTEM FOR TERMINAL

BACKGROUND OF THE INVENTION

The present invention generally relates to power supplying systems, and more particularly to a power supplying system for a subscriber line terminating equipment which has the function of supplying power to a terminal equipment.

Recently, a narrow band integrated services digital network (ISDN) services which provide not only the existing telephone services but also high-speed data communication services using the existing two-wire telephone line equipments have started in order to cope with the demands for high-speed communications. For this reason, at the subscriber, the two-wire telephone line is not directly connected to a telephone set as in the conventional case, but is connected to an ISDN terminal equipment via a Network Termination 1 (NT1) which is a subscriber terminating equipment. The ISDN terminal equipment includes a digital telephone set, a Group 4 facsimile machine or the like.

Figure 1:
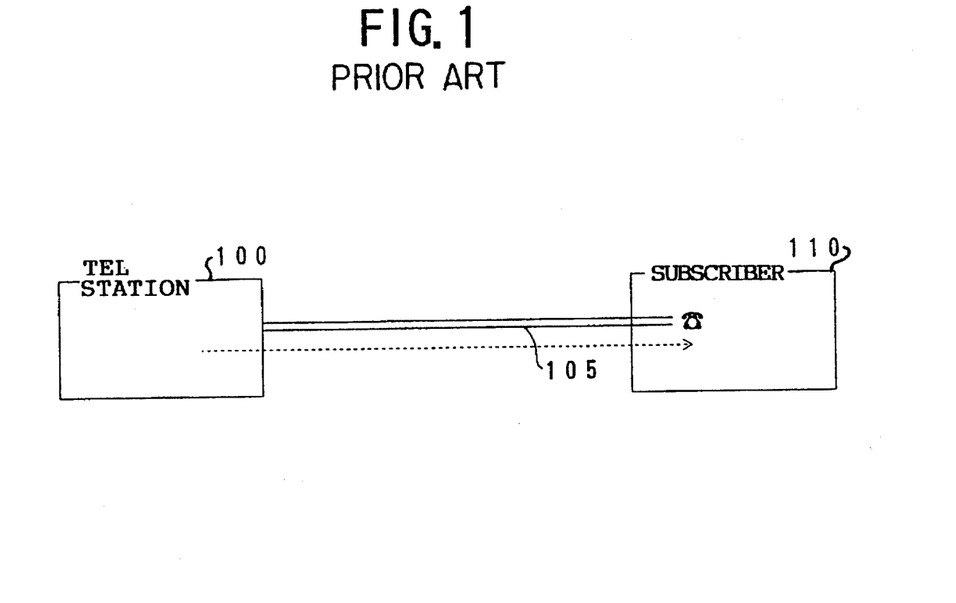
FIG. 1 is a diagram for explaining a conventional telephone service.

In the case of the conventional telephone set or the like, the basic telephone service is provided by supplying power from a telephone station 100 using the voltage that is superimposed on a two-wire telephone line 105 as shown in FIG. 1. The commercial power supply available within a subscriber (home) 110 is used for the added functions other than the telephone service.

Figure 2:
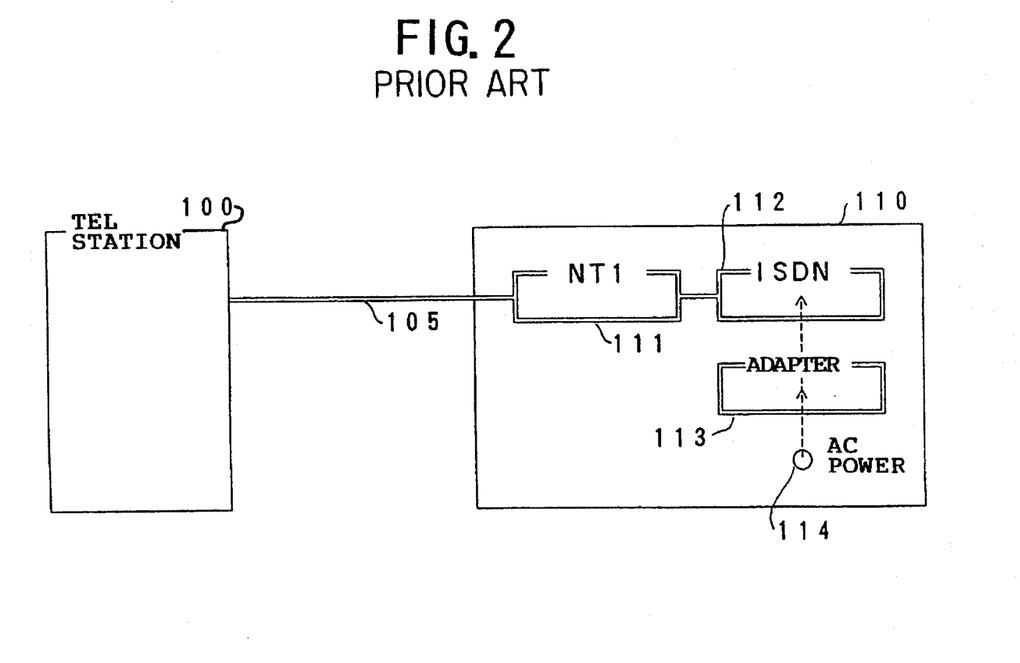
FIG. 2 is a diagram for explaining a conventional ISDN service.
Figure 3:
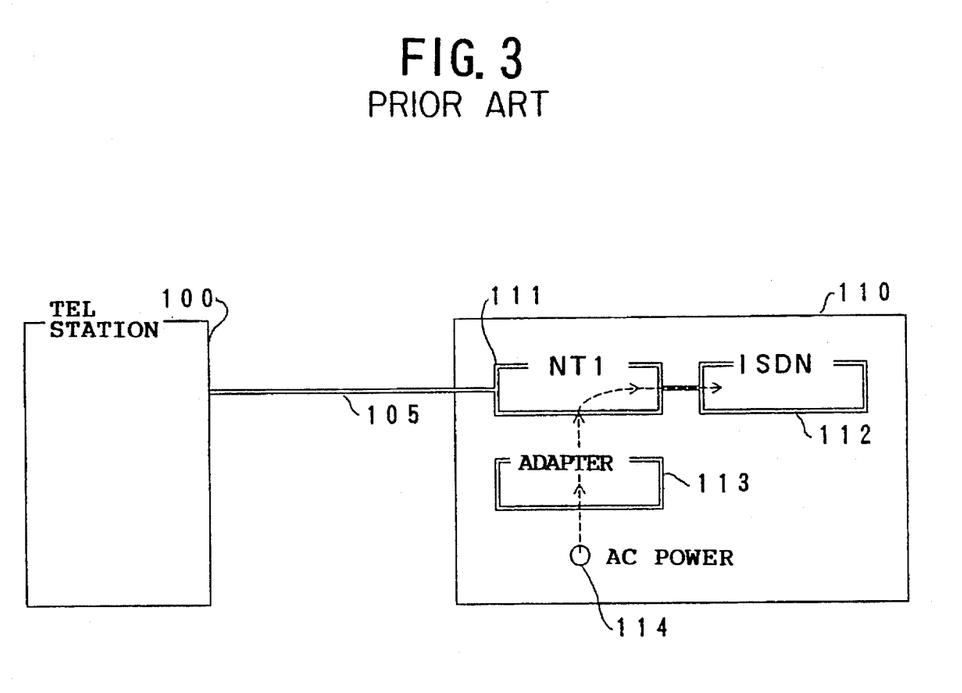
FIG. 3 is a diagram for explaining a conventional ISDN service.

When receiving the ISDN service, the power supplied from the telephone station 100 is insufficient because an ISDN terminal equipment 112 shown in FIG. 2 carries out a variety of functions. Hence, the ISDN terminal equipment 112 itself uses a commercial A.C. power supply 114 within the subscriber 110 as shown in FIG. 2 to receive a local power supply or, an NT1 equipment 111 receives such a local power supply as shown in FIG. 3 to distribute the power with respect to the ISDN terminal equipment 112. In these cases, the power from the commercial A.C. power supply 114 is supplied via a power supply adapter 113 which has the function of converting the commercial A.C. power supply voltage to a D.C. voltage. In FIGS. 2 and 3, phantom arrows indicate the power supplying routes.

In the case of the power supply adapter 113 shown in FIG. 3, a battery backup is provided in order to guarantee the operation of the NT1 equipment 111 even when a power failure of the commercial A.C. power supply 114 within the subscriber 110 occurs. The battery backup of the power supply adapter 113 can supply the power with respect to the NT1 equipment 111 and the ISDN terminal equipment 112 even when the power failure of the commercial A.C. power supply 114 occurs, so that the ISDN terminal equipment 112 can at least receive the minimum telephone service.

Next, a description will be given of the methods of supplying the power from the NT1 equipment 111 to the ISDN terminal equipment 112.

An interface between the NT1 equipment and the terminal equipment prescribed by the CCITT Recommendations 1.430 is also referred to as a S/T interface. The S/T interface is made up of an interface having a total of 6 wires (or a maximum of 8 wires), namely, 4 communication wires for transmitting and receiving and 2 power wires (or feeders) for supplying power to the terminal equipment. According to the above CCITT Recommendations, two methods of supplying the power from the NT1 equipment to the terminal equipment are prescribed, namely, methods called PS1 and PS2.

Figure 4:
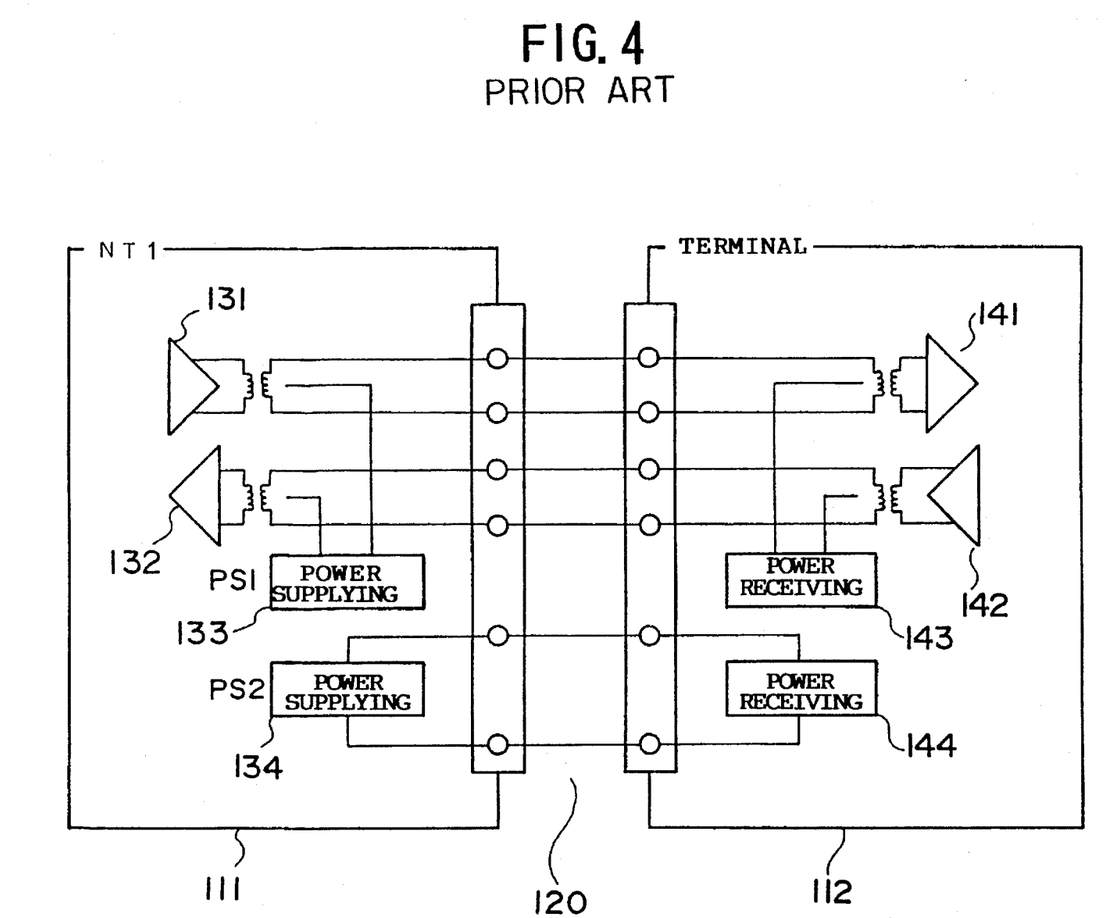
FIG. 4 is a circuit diagram for explaining power supplying methods PS1 and PS2.

FIG. 4 is a circuit diagram for generally explaining the two power supplying methods PS1 and PS2. In FIG. 4, those parts which are the same as those corresponding parts in FIG. 3 are designated by the same reference numerals, and a description thereof will be omitted.

In FIG. 4, the NT1 equipment 111 generally includes a transmitter part 131, a receiver part 132, a power supplying part 133 and a power supplying part 134. On the other hand, the terminal equipment 112 generally includes a receiver part 141, a transmitter part 142, a power receiving part 143 and a power 10 receiving part 144. The NT1 equipment 111 and the terminal equipment 112 are coupled via a S/T interface 120.

Although FIG. 4 shows two power supplying parts and two power receiving parts, this differs from the actual construction. The two power supplying parts and the two power receiving parts are merely shown in this single diagram for the sake of convenience in order to describe both the two power supplying methods PS1 and PS2 using this single diagram.

The power supplying method PS1 is also referred to as a phantom power supplying method. According to this method, a 4-wire communication line is used, and a middle point of the transformer is used to supply the power from the power supplying part 133 within the NT1 equipment 111 to the power receiving part 143 within the terminal equipment 112.

On the other hand, the power supplying method PS2 is also referred to as an exclusive power supplying method. According to this method, 2 wires unrelated to the communication are used exclusively for the power supply. In other words, the power from the power supplying part 134 within the NT1 equipment 111 is supplied to the power receiving part 144 within the terminal equipment 112.

Figure 5:
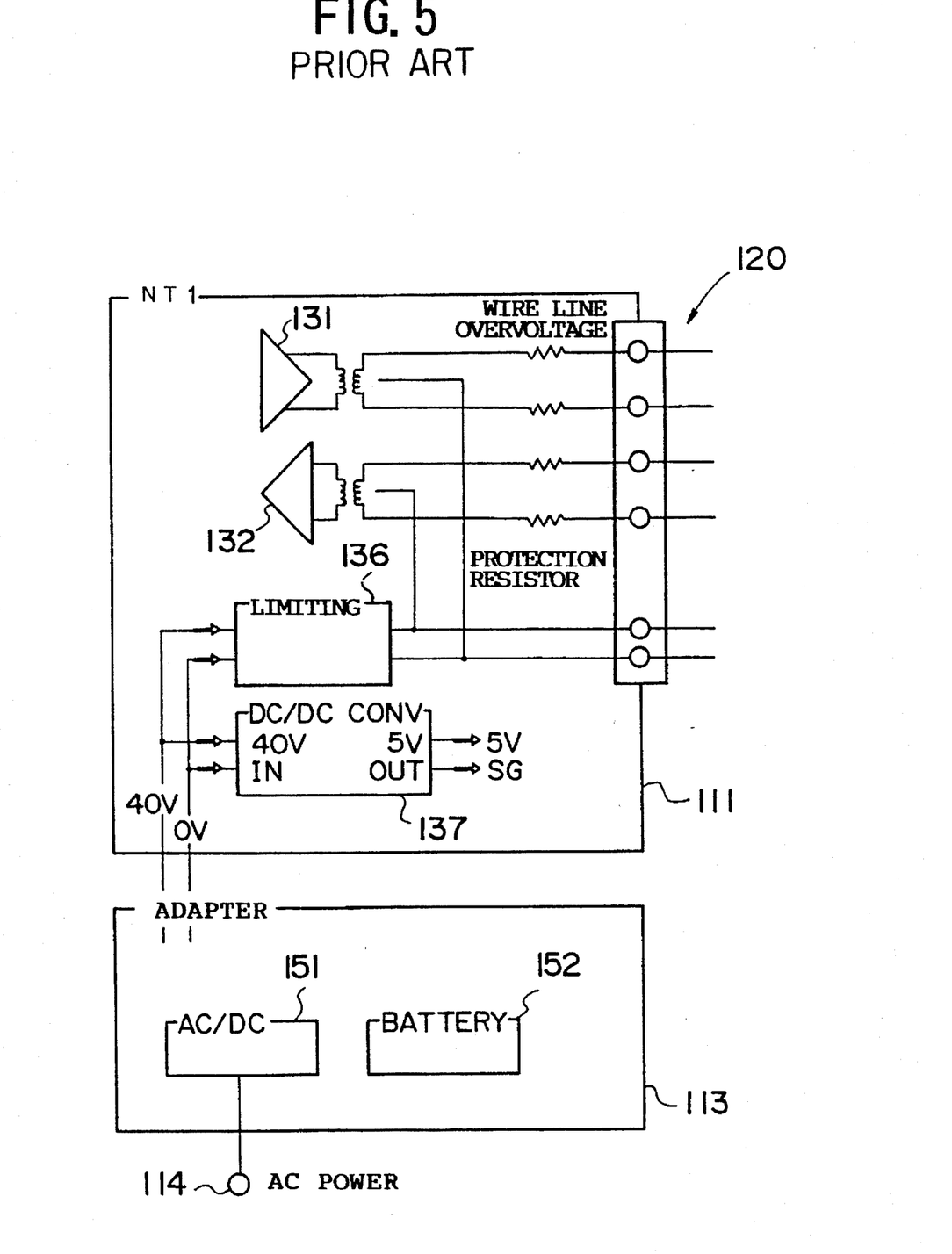
FIG. 5 is a circuit diagram for explaining the construction of a power supplying circuit within an actual NT1 equipment with respect to a terminal equipment and the construction of a power supply adapter for the NT1 equipment.

FIG. 5 is a circuit diagram for explaining the construction of a power supplying circuit within the actual NT1 equipment with respect to the terminal equipment and the construction of the power supply adapter 113 for the NT1 equipment. In FIG. 5, those parts which are the same as those corresponding parts in FIGS. 3 and 4 are designated by the same reference numerals, and a description thereof will be omitted.

In FIG. 5, the NT1 equipment 111 is provided with an excess current limiting circuit 136 and a D.C./D.C. converter 137. The D.C./D.C. converter 137 simply converts a D.C. power supply voltage of 40 V, for example, supplied from the power supply adapter 113 into a D.C. power supply voltage of 5 V, for example, for use within the NT1 equipment 111. On the other hand, the power supply adapter 113 generally includes an A.C./D.C. converter 151 and a backup battery 152. The A.C./D.C. converter 151 converts a commercial A.C. power supply voltage of 100 V, for example, into a D.C. power supply voltage of 40 V, for example.

In the actual NT1 equipment 111, the power supply parts 133 and 134 for supplying the power by the power supplying methods PS1 and PS2 do not exist independently as shown in FIG. 5. In other words, the power is supplied by the power supplying method PS1 or PS2 by passing the D.C. power supply voltage from the power supply adapter 113 as it is through the excess current limiting circuit 136. The excess current limiting circuit 136 is provided to prevent damage to the NT1 equipment 111 and the external power supply adapter 113 when the power supply is instantaneously short-circuited or the like outside the NT1 equipment 111.

The S/T interface 120 is a terminal wiring and it is possible for the short-circuiting of the power supplying route to occur for some reason. When the power supplying method PS1 is employed and such a short-circuiting occurs for 1 wire on the transmitting side and 1 wire on the receiving side, for example, it is still possible to continue the normal communication functions of the NT1 equipment 111. On the other hand, when the power supplying method PS2 is employed and a short-circuiting occurs, it is still possible to continue the normal communication functions of the NT1 equipment 111 because the excess current limiting circuit 136 operates if the terminal equipment 112 does not use the power supply.

In addition, when the terminal equipment 112 which is coupled to the NT1 equipment uses the commercial A.C. power supply instead of using the power supply via the NT1 equipment 111, it is possible to continue the communication even when the above short-circuiting occurs. But since the terminal wiring is closed within the subscriber, the network side is not concerned with the failure of the terminal wiring, and no alarm or the like is provided with respect to the failure of the terminal wiring for the interface between the network side and the terminal equipment side.

Accordingly, even when the above described short-circuiting type failure occurs at the S/T interface 120, it is not the responsibility of the network side, and in addition, the communication service received at the terminal equipment 112 (that is, the subscriber side) is not directly affected by the failure. For these reasons, there is a high possibility that the subscriber will continue to use the terminal equipment 112 in the state where the terminal wiring is short-circuited.

On the other hand, in an extreme case, when the connection is such that the terminal equipment 112 normally operates using the commercial A.C. power supply and operates using the power supply from the NT1 equipment 111 at the time of the power failure, the terminal equipment 112 will normally operate in the normal state even if the short-circuiting type failure occurs at the S/T interface 120 but will not operate if the power failure occurs because the power supplying route will be short-circuited in this latter case.

In other words, although it is impossible to remotely eliminate the short-circuiting type failure at the terminal wiring from the NT1 equipment 111, it is desirable to somehow detect such a short-circuiting type failure. If the short-circuiting type failure can be detected, it is possible to notify the subscriber of the detected short-circuiting type failure so that the short-circuiting type failure may be eliminated.

SUMMARY OF THE INVENTION

Accordingly, it is a general object of the present invention to provide a novel and useful power supplying system in which the problems described above are eliminated.

Another and more specific object of the present invention is to provide a power supplying system which can detect by a NT1 equipment a short-circuiting type failure at a terminal wiring that is normally impossible to detect on the network side or on the subscriber side.

Still another object of the present invention is to provide a power supplying system adapted to a subscriber terminating equipment that supplies power to a subscriber terminal equipment based on a supply of power from an external power supply part, comprising an excess current limiting circuit stopping a supply of power within the subscriber terminating equipment when an excess current is generated in the supply of power from the external power supplying part, and an excess current detection circuit detecting an excess current state. According to the power supplying system of the present invention, it is possible to detect the short-circuiting type failure in the wire line that could not be detected conventionally on the network side or on the subscriber side. The excess current state may be detected by the excess current detection circuit within the subscriber terminating equipment (NT1 equipment), and the detected excess current state, that is, the detected short-circuiting type failure of the power supplying route, may be notified to the subscriber in the form of an alarm or a message that is displayed, for example. In addition, it is possible to forcibly stop the communication based on the detected excess current state, by stopping the functions of the transmitter part and the receiver part within the subscriber terminating equipment, for example. Therefore, it is possible to positively notify the subscriber of the short-circuiting type failure or the like in the power supplying route, regardless of whether the method of displaying the warning, message or the like or the method of forcibly stopping the communication is employed. For this reason, the subscriber can carry out the appropriate operation to eliminate the short-circuiting type failure or the like when notified.

Other objects and further features of the present invention will be apparent from the following detailed description when read in conjunction with the accompanying drawings.

DESCRIPTION OF THE PREFERRED EMBODIMENTS

DESCRIPTION OF THE PREFERRED EMBODIMENTS

Figure 6:
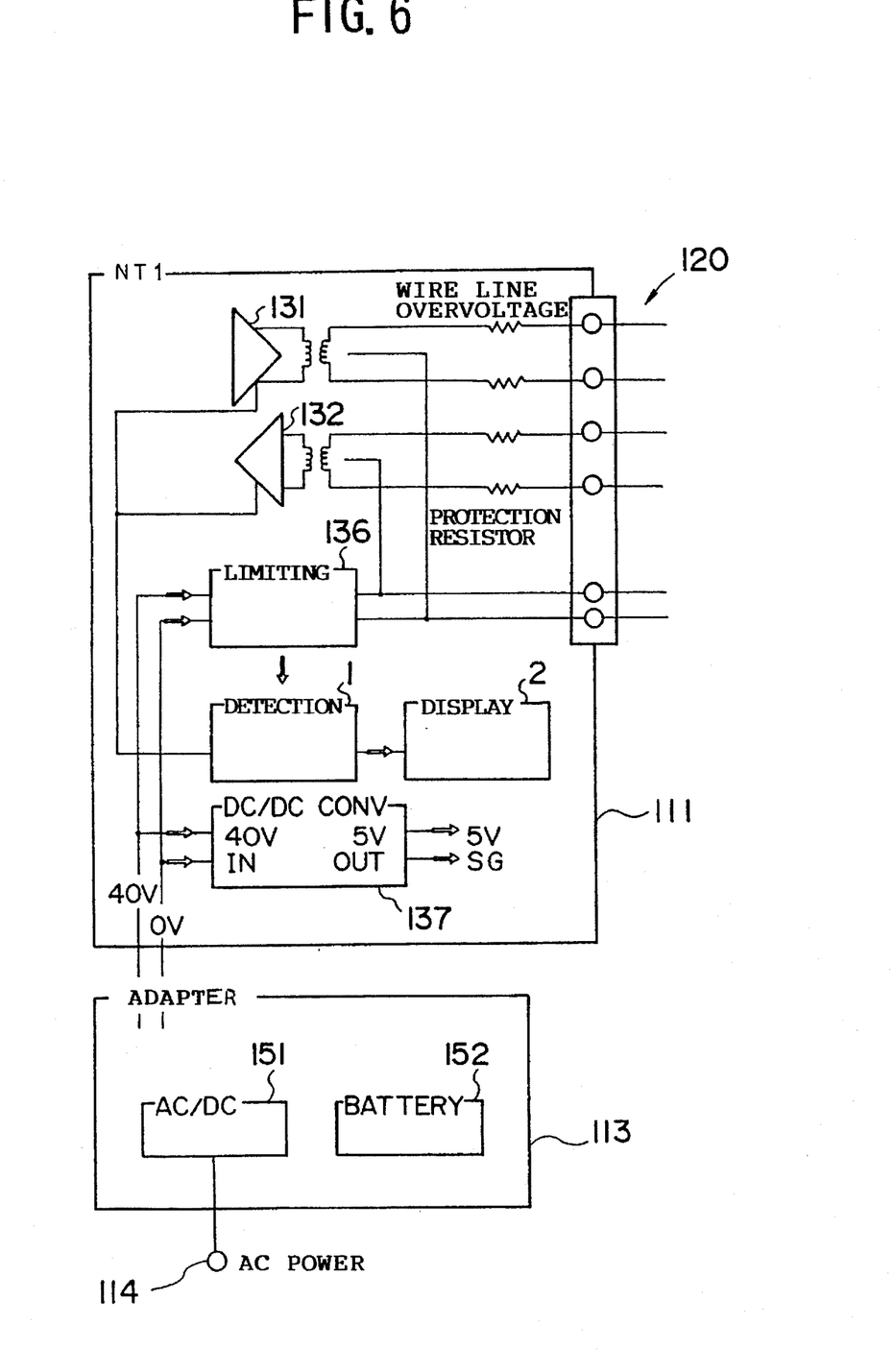
FIG. 6 is a diagram for explaining the operating principle of the present invention.

First, a description will be given of the operating principle of the present invention, by referring to FIG. 6. In FIG. 6, those parts which are the same as those corresponding parts in FIG. 5 are designated by the same reference numerals, and a description thereof will be omitted.

In the present invention, an excess current detection circuit 1 is provided within the subscriber terminating equipment (NT1 equipment) 111. When an excess current is generated at the time of the power supply due to the short-circuiting of the power supplying route or the like, the excess current limiting circuit 136 stops the power supply, and in addition, the excess current detection circuit 1 detects this excess current state.

Since the excess current limiting circuit 136 stops the power supply when the excess current is generated, the excess current detection circuit 1 can detect the short-circuiting of the power supplying route or the like by detecting the excess current state via the excess current limiting circuit 136. In addition, protection resistors (not shown) which are originally provided within the NT1 equipment 111 for the purposes of protecting the terminal equipment 112 from overvoltage on the line wire may be used in common as the excess current detection circuit 1 in order to directly detect the excess current.

Accordingly, it becomes possible to detect in the excess current detection circuit 1 of the NT1 equipment 111 the short-circuiting type failure of the terminal wiring that is normally impossible to detect on the network side or on the subscriber side.

The excess current state that is detected by the excess current detection circuit 1 may be notified to the subscriber using a notifying means. For example, a display part 2 shown in FIG. 6 may be used as the notifying means to display a warning or a message to notify the subscriber of the short-circuiting type failure generated in the power supplying route.

In addition, it is possible to supply a control signal to the transmitter part 131 and the receiver part 132 within the NT1 equipment 111, for example, based on the excess current state that is detected by the excess current detection circuit 1, so as to forcibly stop the communication by stopping the functions of the transmitter part 131 and the receiver part 132 or the like.

When the above protection resistors are used in common as the excess current detection circuit 1, it is possible to forcibly stop the communication when the excess current is generated.

Therefore, regardless of whether the method of displaying the short-circuiting type failure to the subscriber or the method of forcible stopping the communication is employed, it is possible to positively notify the subscriber when the short-circuiting type failure of the power supplying route occurs. Hence, the subscriber can carry out the appropriate operation to eliminate the failure.

Figure 7:
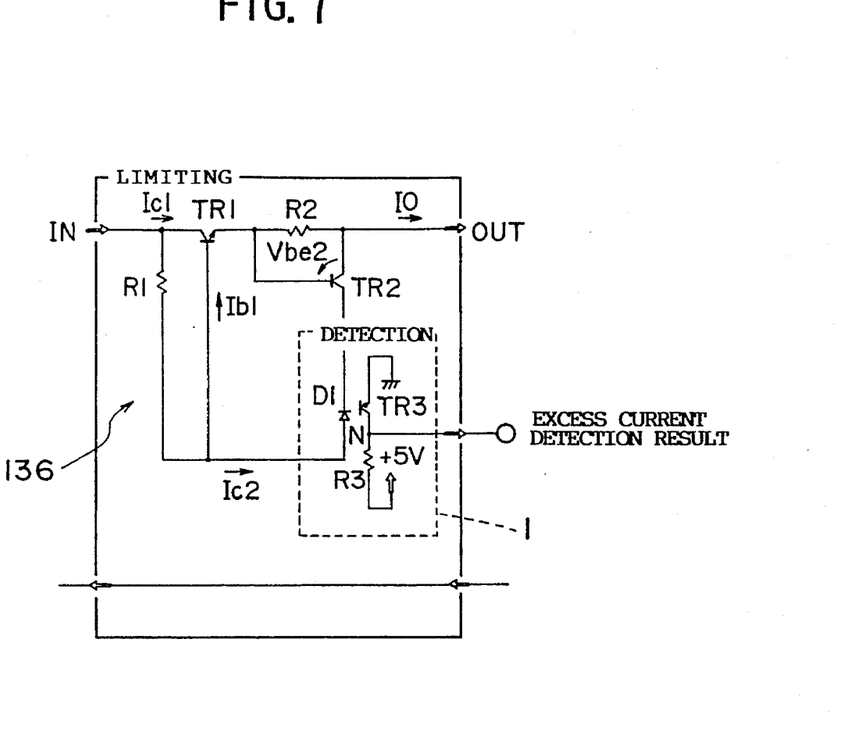
FIG. 7 is a circuit diagram showing an important part of a first embodiment of a power supplying system according to the present invention.

Next, a description will be given of a first embodiment of a power supplying system according to the present invention, by referring to FIG. 7. FIG. 7 is a circuit diagram showing an important part of the first embodiment, namely, an excess current limiting circuit and an excess current detection circuit within a subscriber terminating equipment (NT1 equipment). In FIG. 7, those parts which are the same as those corresponding parts in FIG. 6 are designated by the same reference numerals, and a description thereof will be omitted.

In FIG. 7, the excess current limiting circuit 136 includes transistors TR1 and TR2, resistors R1 and R2, and a light emitting diode (LED) D1 which are connected as shown. On the other hand, the excess current detection circuit 1 includes a phototransistor TR3 which forms a photo-coupler together with the LED D1, and a resistor R3 which are connected as shown.

If an excess current state of an output current I0 occurs due to the short-circuiting of the power supplying route when the power supplying method PS1 or PS2 is employed, a voltage drop of $VR2 = I0 \cdot R2$ occurs across the current detecting resistor R2, where VR2 denotes the voltage across the resistor R2 and R2 denotes the resistance of the resistor R2. In this state, the transistor TR2 turns ON if a relationship $VR2 \geq Vbe2$ stands between a base-emitter voltage Vbe2 of the transistor TR2 and the voltage VR2 across the resistor R2.

Accordingly, when the output current I0 is small, all of the current flowing through the resistor R1 becomes a base current Ib1 of the transistor TR1. However, when the output current I0 increases, the current is split into a current Ib1 and a current Ic2, and as a result, a collector current Ic1 of the transistor TR1, that is, the output current I0, decreases.

Therefore, when the current Ic2 flows through the LED D1, this current Ic2 is detected by the phototransistor TF3. Hence, a detection signal which indicates the result of the detection of the excess current is obtained from a node N which connects the phototransistor TR3 and the resistor R3.

The detection signal from the node N may be supplied to the display part 2 as described above in conjunction with FIG. 6, so as to display the warning, message or the like to notify the subscriber of the short-circuiting type failure that occurred in the power supplying route.

Alternatively, the detection signal from the node N may be supplied to the transmitter part 131 and the receiver part 132 within the NT1 equipment 111 as a control signal, so as to stop the functions of the transmitter part 131 and the receiver part 132 and to forcibly stop the communication between the NT1 equipment 111 and the terminal equipment 112.

It is possible to positively notify the subscriber of the short-circuiting type failure or the like in the power supplying route, regardless of whether the method of displaying the warning, message or the like or the method of forcibly stopping the communication is employed. For this reason, the subscriber can carry out the appropriate operation to eliminate the short-circuiting type failure or the like when notified.

Figure 8:
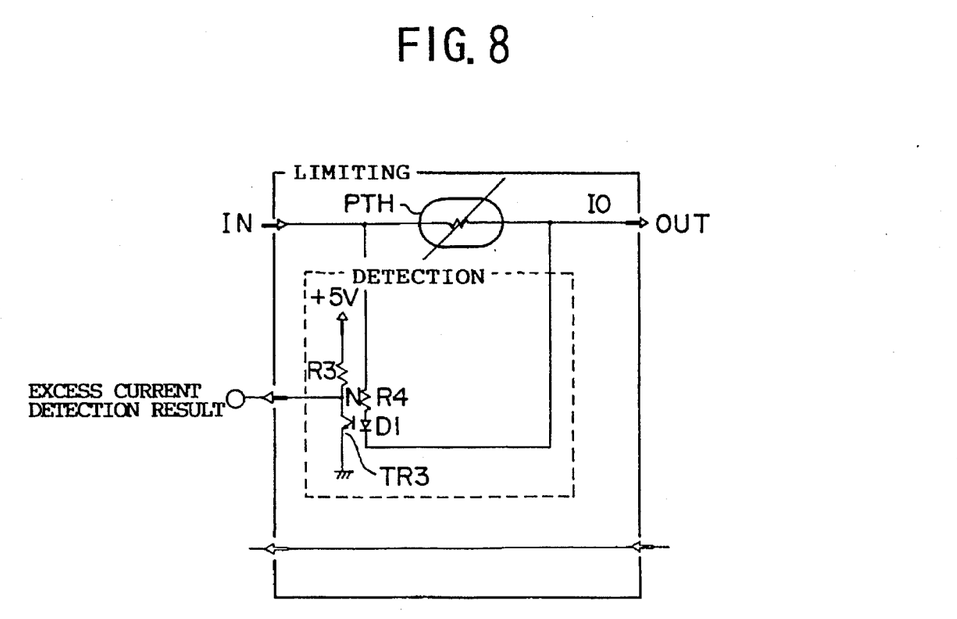
FIG. 8 is a circuit diagram showing an important part of a second embodiment of the power supplying system according to the present invention.

Next, a description will be given of a second embodiment of the power supplying system according to the present invention, by referring to FIG. 8. FIG. 8 is a circuit diagram showing an important part of the second embodiment, namely, the excess current limiting circuit and the excess current detection circuit within the NT1 equipment. In FIG. 8, those parts which are the same as those corresponding parts in FIGS. 6 and 7 are designated by the same reference numerals, and a description thereof will be omitted.

In FIG. 8, the excess current limiting circuit 136 includes a passive element PTH, a resistor R4, and a LED D1 which are connected as shown. In this embodiment, the passive element PTH is a posistor. The posistor normally has a low impedance, but has a high impedance when an excess current flows through the posistor due to the short-circuiting of the power supplying route or the like and the posistor generates heat thereby. On the other hand, the excess current detection circuit 1 shown in FIG. 8 has the same construction as that of the first embodiment shown in FIG. 7.

When the power supplying method PS1 or PS2 is employed and the excess current which is caused by the short-circuiting of the power supplying route flows through the passive element PTH, the impedance of the passive element PTH becomes high and the output current I0 decreases. In other words, when the passive element PTH shows a high impedance, a high voltage which is different from that in the normal state is generated across both ends of the passive element PTH. Accordingly, a photo-coupler formed by the LED D1 and the phototransistor TR3 detects the excess current by detecting the high voltage which is different from that of the normal state. Similarly as in the case of the first embodiment, the detection signal which indicates the result of the detection of the excess current is output via the node N.

Similarly to the first embodiment, it is possible to positively notify the subscriber of the short-circuiting type failure or the like in the power supplying route, regardless of whether the method of displaying the warning, message or the like or the method of forcibly stopping the communication is employed. For this reason, the subscriber can carry out the appropriate operation to eliminate the short-circuiting type failure or the like when notified.

Figure 9:
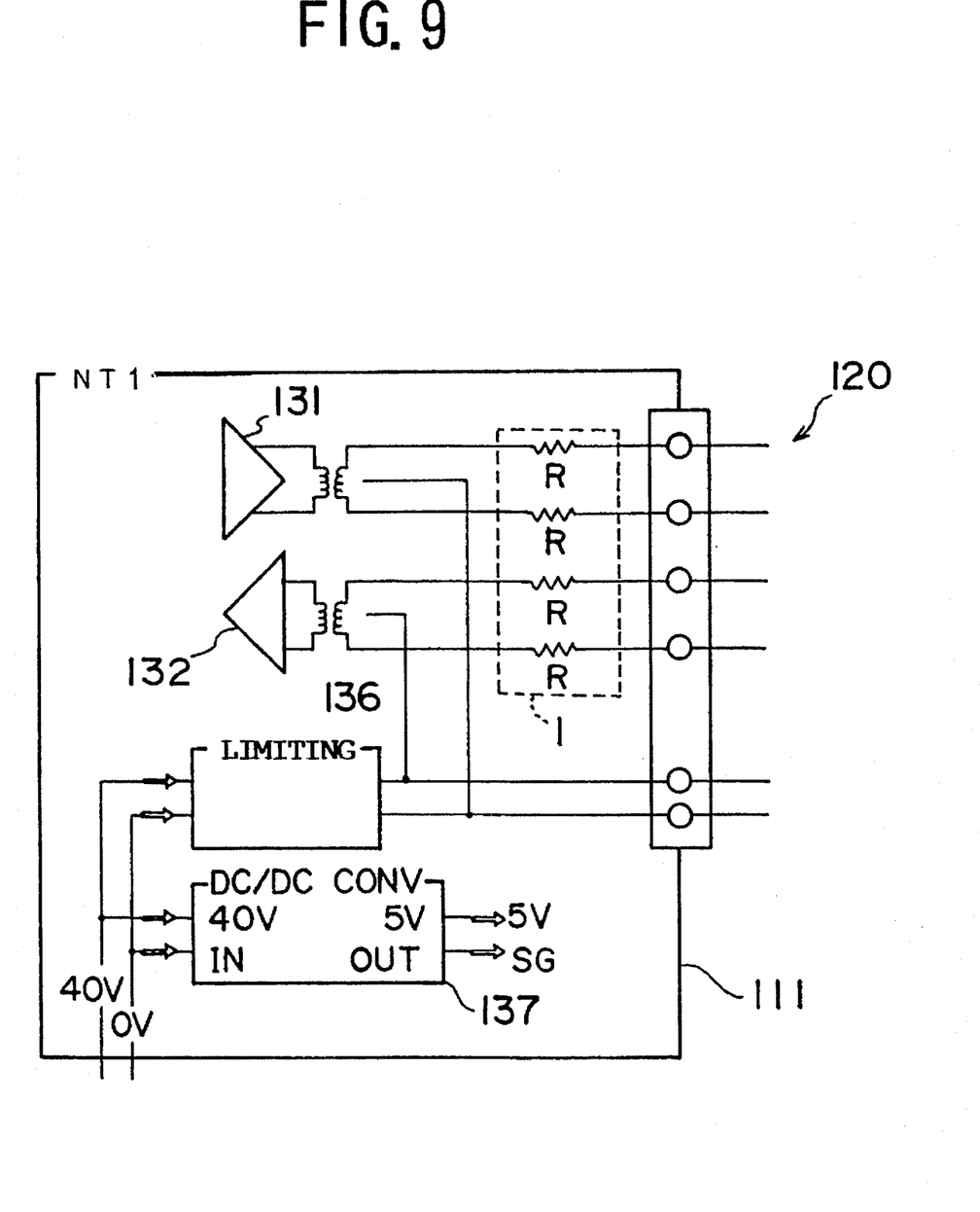
FIG. 9 is a circuit diagram showing an important part of a third embodiment of the power supplying system according to the present invention.

Next, a description will be given of a third embodiment of the power supplying system according to the present invention, by referring to FIG. 9. FIG. 9 is a circuit diagram showing an important part of the second embodiment, namely, the excess current limiting circuit and the excess current detection circuit within the NT1 equipment. In FIG. 9, those parts which are the same as those corresponding parts in FIG. 6 are designated by the same reference numerals, and a description thereof will be omitted.

In the first and second embodiments described above, the excess current is detected using the excess current limiting circuit 136 within the NT1 equipment 111. However, protection resistors R are originally provided within the NT1 equipment 111 for the purposes of protecting the terminal equipment 112 from an overvoltage on the line wire. These protection resistors R prevent a voltage exceeding a tolerable range from being applied to the transmitting and receiving lines, and basically correspond in function to the excess current limiting circuit 136 described above. Hence, this embodiment uses the protection resistors R in common as the excess current detection circuit 1.

In FIG. 9, the excess current detection circuit 1 includes the protection resistors R. The protection resistor R may be made of a fuse-type resistor which melts, a posistor and the like. For the sake of convenience, it is assumed in this embodiment that the protection resistor R is made of a posistor.

When the power supplying method PS1 is employed in this embodiment, the excess current flows through the protection resistors (posistors) R of the excess current detection circuit 1 when the power supplying route is short-circuited, and as a result, the impedance of the protection resistor R becomes high. Therefore, the supply of the excess current is limited, and at the same time, the communication (transmitting and receiving operation) is forcibly stopped because the protection resistors R are inserted in the communication line.

Similarly to the first and second embodiments, it is possible to positively notify the subscriber of the short-circuiting type failure or the like in the power supplying route, regardless of whether the method of displaying the warning, message or the like or the method of forcibly stopping the communication is employed. For this reason, the subscriber can carry out the appropriate operation to eliminate the short-circuiting type failure or the like when notified.

Further, the present invention is not limited to these embodiments, but various variations and modifications may be made without departing from the scope of the present invention.

What is claimed is:

1. A power supplying system adapted to a subscriber terminating equipment that is connected to and supplies power to a subscriber terminal based on a supply of power from an external power supply part to the subscriber terminating equipment, said power supplying system comprising:

an excess current limiting circuit for stopping a supply of power within the subscriber terminating equipment when an excess current is generated in the supply of power from the external power supplying part;

an excess current detection circuit for detecting an excess current state and outputting a detection signal when the excess current state is detected based on an output of said excess current limiting circuit; and stop means for forcibly stopping a communication function between the subscriber terminating equipment and the subscriber terminal based on the detection signal output from said excess current detection circuit.

2. The power supplying system as claimed in claim 1, which further comprises notifying means for notifying the excess current state based on the detection signal output from said excess current detection circuit.

3. The power supplying system as claimed in claim 1, wherein the subscriber terminating equipment is coupled to the subscriber terminal via an S/T interface, and the supply of power from the external power supplying part is made to the subscriber terminal via the subscriber terminating equipment according to a phantom power supplying method (PS1) or an exclusive power supplying method (PS2).

4. The power supplying system as claimed in claim 1, which further comprises a protection circuit for protecting the subscriber terminal from an overvoltage of a wire line connecting the subscriber terminating equipment and the subscriber terminal.

5. The power supplying system as claimed in claim 4, wherein said protection circuit includes elements selected from a group consisting of fuse-type resistors and posistors, said elements having a high impedance with respect to an excess current.

6. The power supplying system as claimed in claim 5, wherein said elements of the protection circuit are used in common as elements forming said excess current detection circuit.

7. A power supplying system adapted to a subscriber terminating equipment that is connected to and supplies power to a subscriber terminal based on a supply of power from an external power supply part to the subscriber terminating equipment, said power supplying system comprising:

an excess current limiting circuit for stopping a supply of power within the subscriber terminating equipment when an excess current is generated in the supply of power from the external power supplying part; and an excess current detection circuit including passive elements respectively having an impedance which increases as an excess current state is approached, for detecting the excess current state based on a terminal voltage of said passive elements.

8. The power supplying system as claimed in claim 7, wherein said current detection circuit forcibly stops a communication function between the subscriber terminating equipment and the subscriber terminal in the excess current state.

9. The power supplying system as claimed in claim 8, wherein said passive elements of said current detection circuit are inserted in a communication line within the subscriber terminating equipment, and are used in common as said excess current limiting circuit.

10. The power supplying system as claimed in claim 7, and further comprising a protection circuit for protecting the subscriber terminal from an overvoltage of a wire line connecting the subscriber terminating equipment and the subscriber terminal.

11. The power supplying system as claimed in claim 10, wherein said protection circuit includes elements selected from a group consisting of fuse-type resistors and posistors, said elements having a high impedance with respect to an excess current.

12. The power supplying system as claimed in claim 11, wherein said elements of the protection circuit are used in common as elements forming said excess current detection circuit.

\* \* \* \* \*